William C. Snead
INVENTOR.

Jan. 26, 1971 W. C. SNEAD 3,558,177
PLANT DIGGING MACHINE
Filed Oct. 10, 1968 5 Sheets-Sheet 2

William C. Snead
INVENTOR.

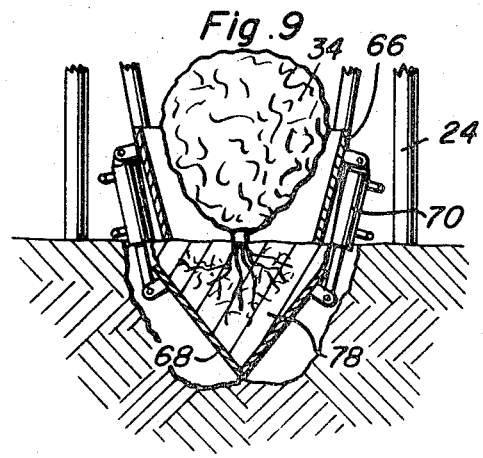
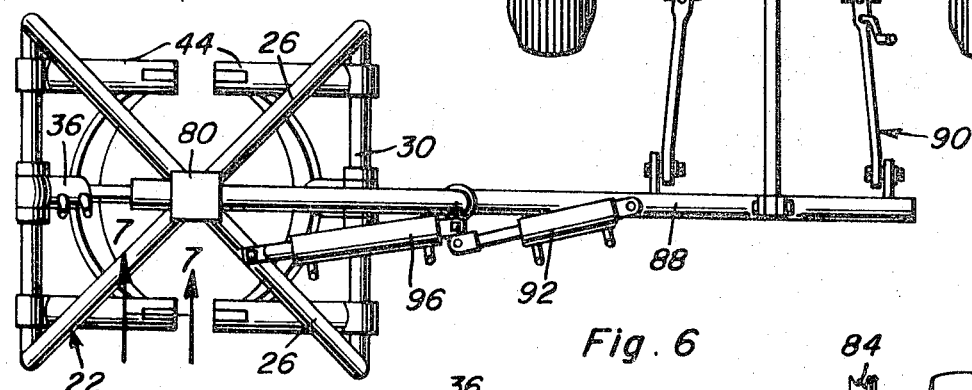
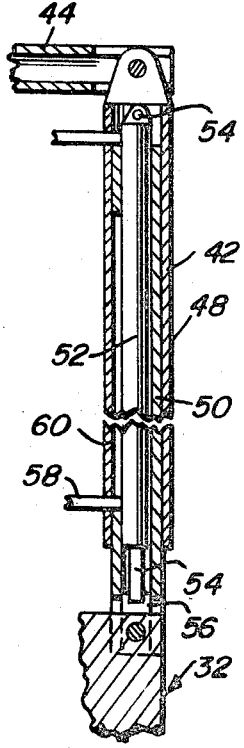
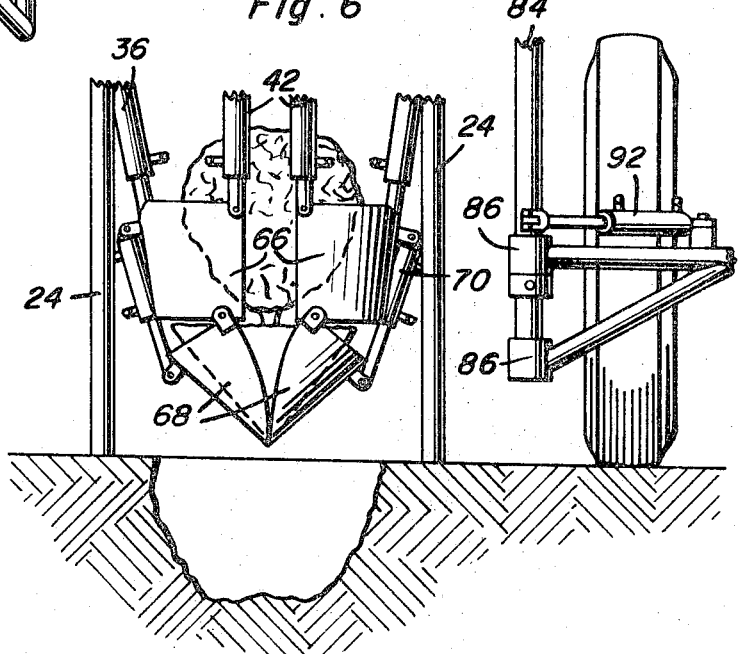

Jan. 26, 1971 W. C. SNEAD 3,558,177
PLANT DIGGING MACHINE
Filed Oct. 10, 1968 5 Sheets-Sheet 4

William C. Snead
INVENTOR.

BY *Clarence A. O'Brien*
*and Harvey B. Jacobson*
Attorneys

Jan. 26, 1971 W. C. SNEAD 3,558,177
PLANT DIGGING MACHINE
Filed Oct. 10, 1968 5 Sheets-Sheet 5

William C. Snead
INVENTOR.

BY *Clarence A. O'Brien*
*and Harvey B. Jacobson*
Attorneys

United States Patent Office 3,558,177
Patented Jan. 26, 1971

3,558,177
PLANT DIGGING MACHINE
William C. Snead, Rte. 1, Belton, Mo. 64012
Filed Oct. 10, 1968, Ser. No. 766,419
Int. Cl. B65d 51/00
U.S. Cl. 294—70
14 Claims

ABSTRACT OF THE DISCLOSURE

A digging machine for shrubs, small trees, and the like, including a pair of opposed arcuate digging blades mountable for lateral movement toward and away from each other so as to be positionable about a plant to be dug. The actual driving and retraction of the blades are controlled by both pneumatic and hydraulic rams with the entire machine being mountable upon a tractor or the like through a conventional three-point hitch. Each of the arcuate blades includes a lower hingedly mounted arcuate portion which is selectively movable, through a hydraulic ram, into a position directly underlying the plant subsequent to an initial driving of the blades so as to effectively sever the roots of the involved plant and form a ball of soil or dirt to be removed with the plant.

---

The instant invention is generally concerned with the transplanting of plants of various types, and more particularly relates to a power-operated digging machine for removing shrubs, small trees, and the like together with a major portion of the root system thereof enclosed within a ball of dirt.

It is a significant object of the instant invention to provide a digging machine which will effectively form a ball of dirt about the root system of the plant and remove the plant from the ground with the ball intact, the plant thus being ready for immediate replanting or wrapping for replanting at a later date or in a remote location.

Another significant object of the instant invention resides in the provision of a plant digging machine wherein the entire digging operation, including the positioning of the machine, is effected automatically, preferably being controlled from the tractor itself.

Further, it is considered particularly significant that the machine of the instant invention be of a rugged construction capable of field operation, and requiring only a minimum amount of maintenance.

Basically, the advantages of the machine comprising the instant invention reside in the unique provision of arcuate blades which are driven generally vertically into the ground so as to encircle a plant and, by means of pivoted power driven lower blade sections, define a ball of soil about a major portion of the root system of the plant. Upon a formation of the ball of dirt, the ball and plant are removed from the ground through a retraction of the drive and guiding power rams for, through the various positioning members, a positioning of the plant on, as an example, an appropriate wrapping device for a wrapping of the ball of dirt in burlap.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is a top plan view of the tractor-mounted machine;

FIG. 6 illustrates the elevated plant and associated ball of dirt;

FIG. 7 is an enlarged cross-sectional view taken substantially on a plane passing along line 7—7 in FIG. 3;

FIG. 9 is a cross-sectional elevation of the lower ball-forming portion of the machine positioned as in FIG. 5;

FIG. 10 is a perspective detail of the upper portion of one of the digging blades;

Figure 1:
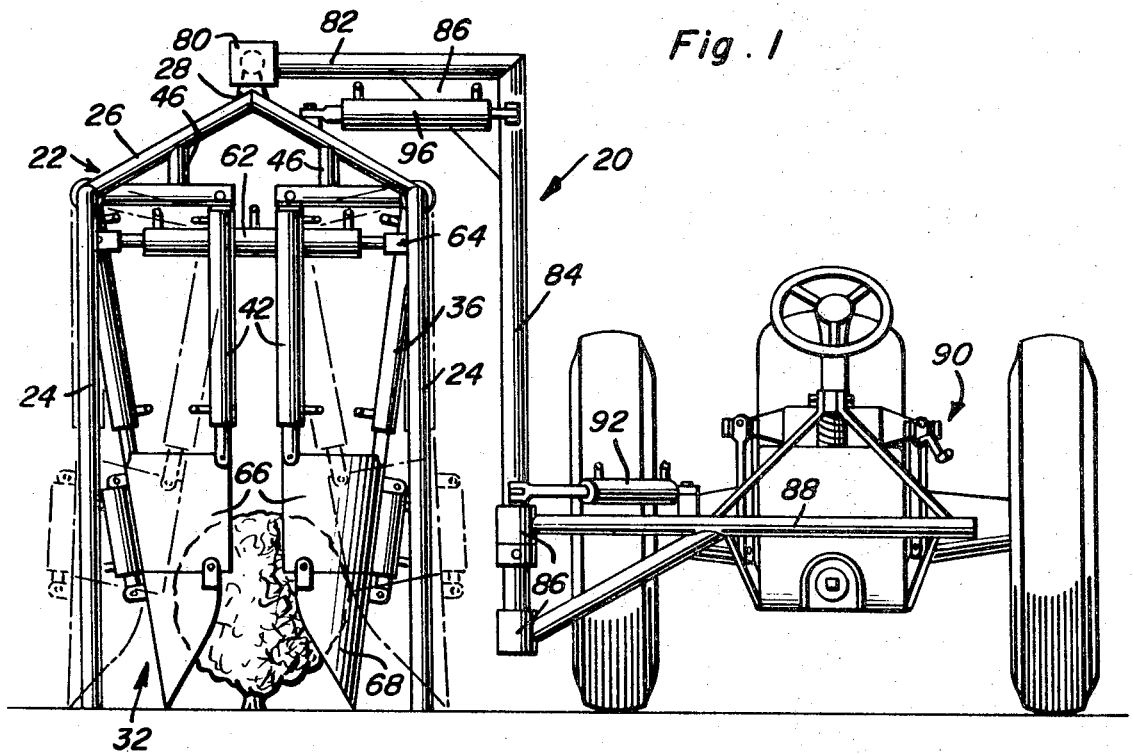
FIG. 1 is a rear elevational view of a tractor with the plant-digging machine mounted thereon in operative position.

Referring now more specifically to the drawings, reference numeral 20 is used to generally designate the machine comprising the instant invention. The actual digging portion of the machine includes a vertical frame 22 consisting of four rectangularly orientated vertical columns 24 interconnected at the upper ends thereof by diagonal inclined beams 26 which are rigid with and extend from the upper end of each column 24 to a common peak 28. Finally, the frame 22 includes a pair of rigid cylindrical rails or beams 30, each rigidly affixed to and extending laterally between the upper ends of a pair of the columns 24. These rails 30, as will be readily appreciated from the drawings, are in opposed parallel relation to each other.

The digging itself is effected by a pair of opposed, arcuate and generally vertically orientated digging blades 32. These blades 32 are so orientated as to downwardly converge toward each other and, in the lowermost driven position thereof, substantially completely encircle a plant 34 to be removed. The actual driving of each of the blades is effected primarily by means of a double-acting pneumatic or air ram 36 which has the cylinder end thereof rotatably mounted on the corresponding overlying rail 30 as indicated by reference numeral 38, and the piston rod end thereof rigidly affixed to the upper edge portion of the corresponding arcuate blade 32 approximately at the center point therealong as indicated at reference numeral 40. As previously indicated, the blades incline or slope generally downward toward each other. This downward general convergence of the blades 32 allows the blades to slope inwardly under the foliage of the plant 34 and accommodate an enlarged plant top without requiring the digging of a greater than necessary ball of soil. Each pneumatic ram 36 is so orientated with the blade 32 rigidly affixed to the piston rod end thereof as to constitute a linear continuation of the rear centerline of the blade 32 whereby a straight driving force will be exerted through the blade 32 to the lower earth-penetrating edge thereof, thus avoiding any tendency for the blade 32 to twist during the driving operation.

In order to both assist in the driving of the blades 32 and guide the blades 32 during the driving operation, each blade 32 has a hydraulic ram 42 extending generally vertically from each end of the arcuate upper edge to a pair of generally horizontally directed rigid arms 44.

These arms 44 are in turn rotatably mounted on the corresponding rail 30 in the same manner as the corresponding pneumatic ram 36. Each hydraulic ram 42 has the cylinder end thereof pivotally fixed to the free end of the corresponding arm 44, and has the piston rod end thereof pivotally fixed to the upper edge portion of the corresponding blade 32 so as to incline slightly during the driving of the blade 32 for an accommodation of the inward movement of the blade 32 resulting from a driving of the blade at an angle. Further, in order to provide an abutment against which the thrust of the hydraulic rams 42 can operate, a rigid stop or abutment member 46 depends from each diagonal beam 26 for engagement by the ram mounting arms 44 as these arms 44 move into operative position in conjunction with a positioning of the blades 32 as shall be described presently.

Referring specifically to FIG. 7, for purposes of introducing additional rigidity into the hydraulic rams 42, a pair of telescoping guide tubes 48 and 50 can be provided. The tube 50, constituting the outer tube, will be pivotally mounted to the overhead arm 44. The inner tube 50 will in turn be pivotally engaged with the upper edge portion of the blade 32. The ram cylinder 52 will be received through the inner tube 50 and pinned, as at 54, to the outer tube 42 adjacent the pivotally mounted upper end thereof. The piston rod 54 associated with the cylinder 52 will be pivotally pinned, through a yoke type end 56 thereon, to the edge of the blade 32 utilizing the same means pivotally securing the lower end of the inner tube 50. In this manner, the inner tube 50 will extend and retract with the piston rod 54 and thereby provide an additional degree of stability. In order to accommodate the sliding movement of the inner tube 50 with the piston rod 54 without interference with the return hydraulic line 58, the inner tube 50 can be provided with an elongated slot 60 therein. If so desired, such rigidifying telescoping tubes can also be associated with the pneumatic rams 36.

With reference to FIG. 1 in particular, a double-acting hydraulic ram 62 extends between the upper end portions of the opposed pneumatic rams 36 and is pivotally or hingedly engaged with both through an appropriate yoke means 64 on each end of the ram 62. This ram 62 is utilized in swinging the digging blades laterally relative to each other, as indicated in phantom lines in FIG. 1, so as to facilitate a positioning of the blades about a shrub 34 to be dug. In other words, the ram 62 will be extended so as to space the blades 32, after which the blades will be positioned to the opposite sides of a plant 34 and the blades 32 swung inwardly to the desired digging position. In swinging the blades outward, as well as inward, the rams 36 and 42 will swing about the rails 30, the support arms 44 for the hydraulic rams 42 swinging away from the abutments 46 and then swinging back into engagement therewith as the blades come into the digging position.

Figure 5:
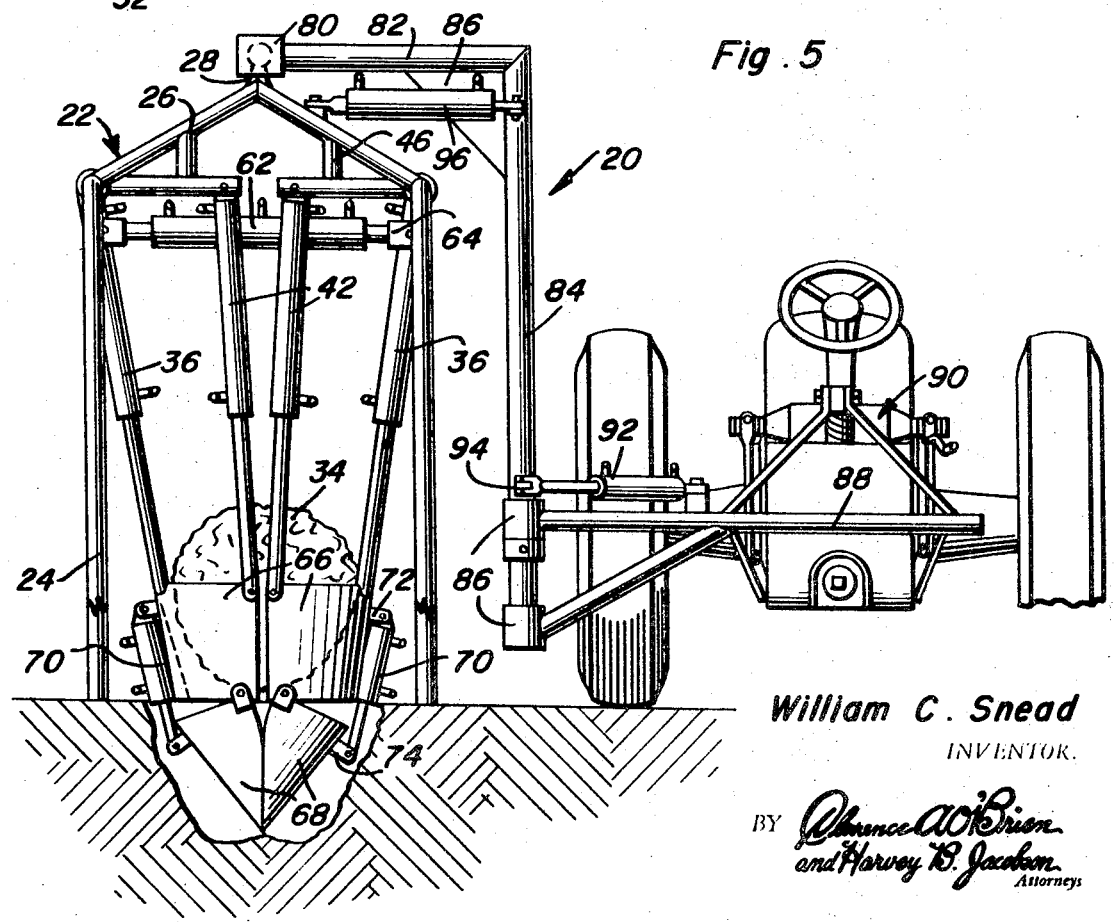
FIG. 5 is a rear elevational view similar to FIG. 1 illustrating the final orientation of the machine prior to a raising of the plant from the soil.
Figure 2:
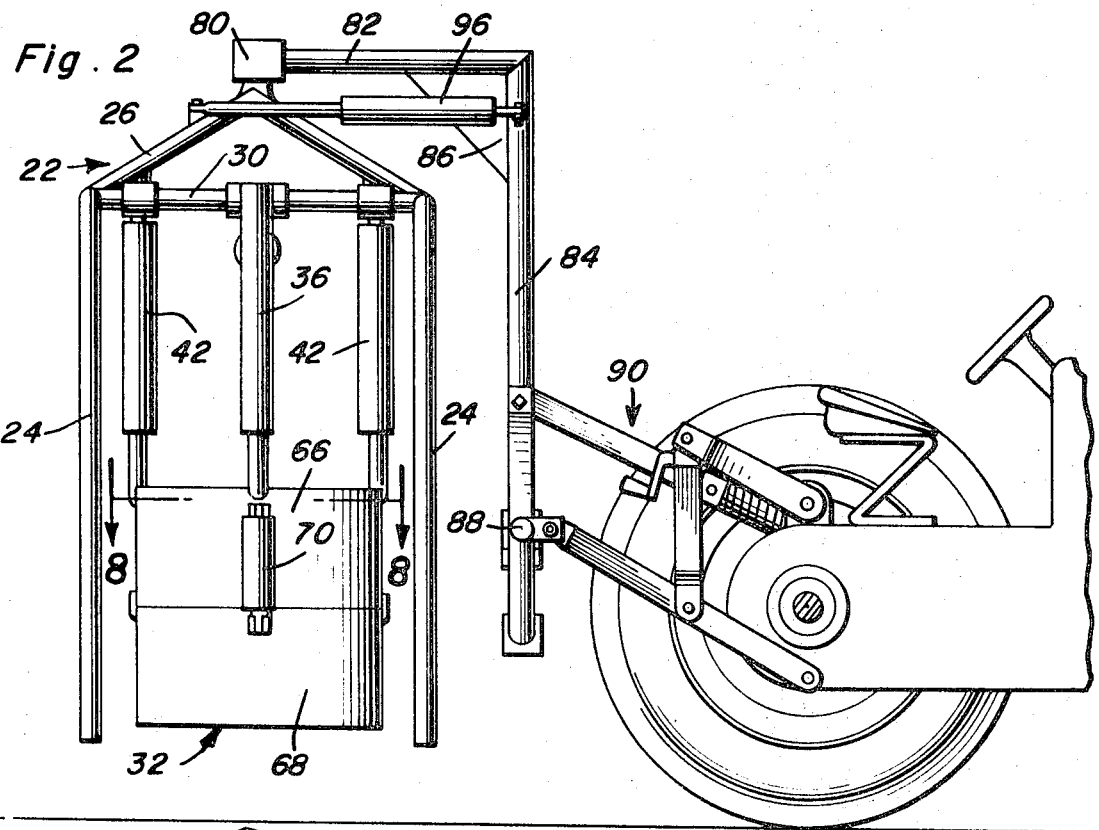
FIG. 2 is a view taken from the right hand side of FIG. 1 with the rear tractor wheel removed.
Figure 4:
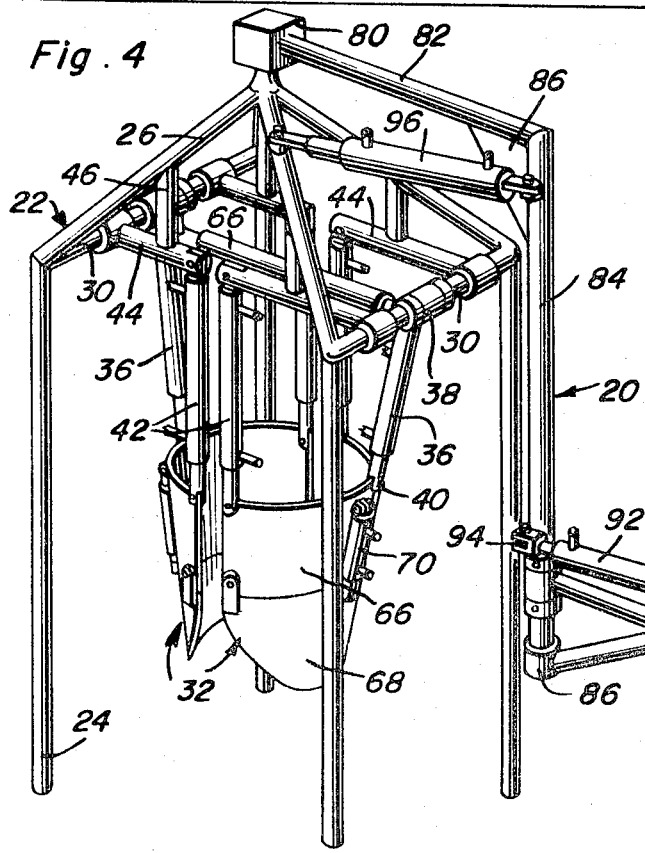
FIG. 4 is a perspective view of the plant-digging machine.
Figure 8:
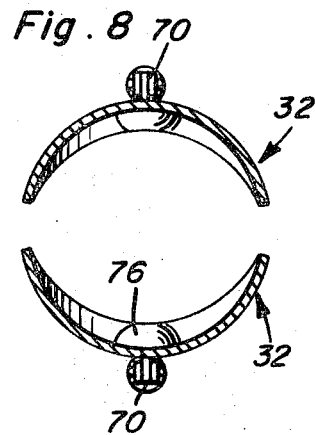
FIG. 8 is a transverse cross-sectional view taken substantially on a plane passing along line 8—8 in FIG. 2.
Figure 11:
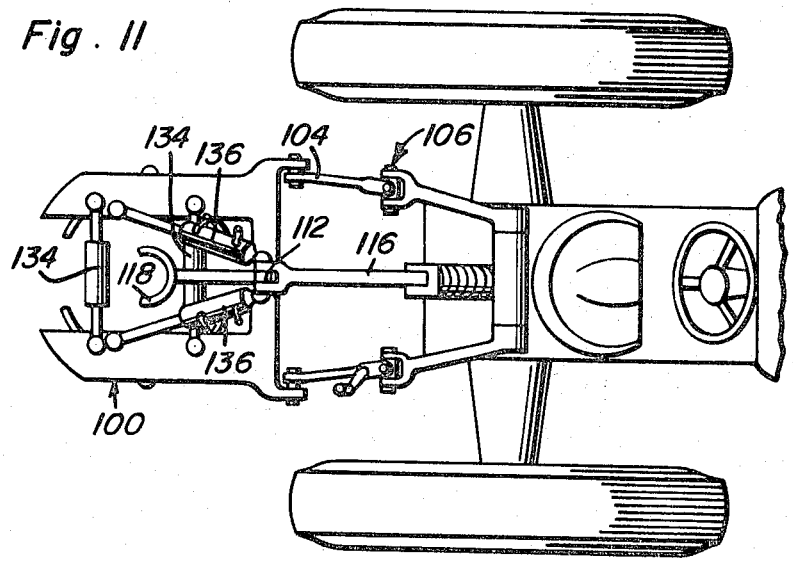
FIG. 11 is a top plan view of a modified form of digging machine mounted on a tractor.
Figure 12:
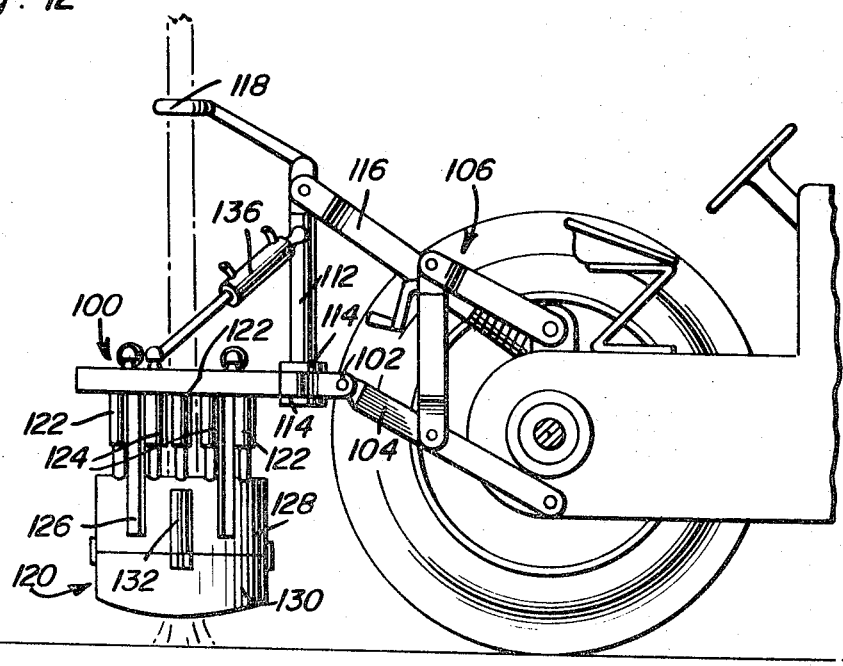
FIG. 12 is a side elevational view of the tractor-mounted machine of FIG. 11.
Figure 13:
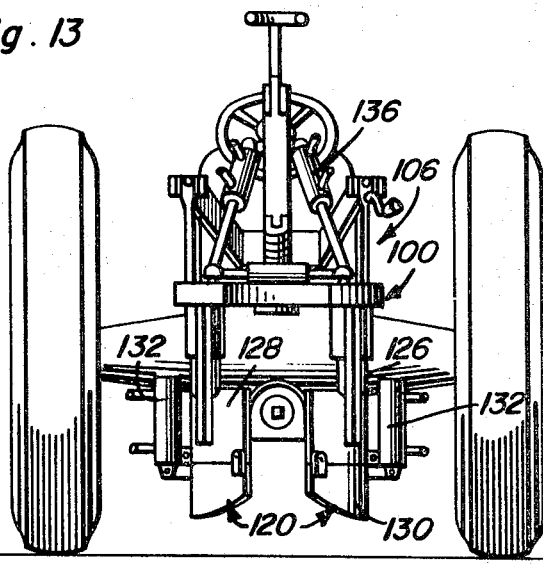
FIG. 13 is a rear elevational view of the machine of FIG. 11.

Each of the digging blades 32 is in fact formed of two portions, an upper portion 66 and a lower pivotally mounted arcuate portion 68. Each of these arcuate portions 68 is pinned to the lower edge portion of the corresponding upper blade portion 66 adjacent the opposed inwardly directed ends thereof for a pivotal movement of the lower blade portions 68 inwardly toward each other as will be best appreciated upon a viewing of FIGS. 5 and 6 in particular. The pivotal movement of these lower blade portions 68 is effected by means of hydraulic rams 70, one associated with each blade portion 68. Each ram 70 has the cylinder end thereof pivotally mounted between a pair of mounting ears 72 affixed to the corresponding upper blade portion 66, and the lower piston rod end pivotally affixed, through appropriate ear means 74, to the underlying lower blade portion 68 whereby, upon an extension of the ram 70, a downward and inward pivoting of the associated blade portion 68 will result. As will be best appreciated from FIGS. 9 and 10, the upper blade portion 66 can be centrally relieved or recessed, as indicated by reference numeral 76, so as to accommodate the inward swinging of the ram 70 as it follows the inward swinging of the associated lower blade portion 68. In this manner, after the blades 32 have been driven to the desired distance, the lower end portions 68 are swing inwardly so as to move beneath the major portion of the root system of the plant 34 being dug, severing the roots and defining a ball of dirt or soil 78 which is removed with the plant 34. With reference to FIG. 6 in particular, as the digging blades 32 are retracted so as to effect an actual lifting of the plant and ball of dirt from the ground, these blades 32 tend to follow the path along which they were initially introduced into the ground. As such, continuous pressure can be applied to the blade portion moving rams 70 so as to move the lower blade portions 68 continuously inward, thereby retaining a firm seat for the lifted plant.

Referring now to the mounting and positioning apparatus for the blade mounting frame 22, the peak defined by the converging beams 26 is secured for free swinging movement within a socket 80, this joint being, if so desired, in the nature of a ball-and-socket joint enabling an actual suspension of the frame 22 from the socket 80. The socket 80 is formed on the outer end of an elongated horizontally directed arm 82 which projects beyond the frame 22 and is in turn rigidly affixed to the upper end of a rigid pedestal or post 84. If so desired, an appropriate rigidifying gusset plate 86 can be provided between the pedestal 84 and the arm 82. The lower end of the pedestal 84 is rotatably supported by means of a pair of vertically aligned collars 86 affixed to a crossbeam 88 which is in turn mounted on the three-point hitch unit 90 of a tractor whereby a vertical raising and lowering of the pedestal 84, and the entire digging machine 20 therewith, can be easily effected, while still retaining the rotatable nature of the pedestal 84. The actual rotation of the pedestal 84, and hence the lateral swinging of the blade supporting frame 22, is effected by a hydraulic ram 92 engaged between the support beam 88 and a laterally projecting ear 94 affixed to the pedestal 84, both ends of the ram 92 of course being pivotally mounted. In addition to providing for a swinging of the entire unit through a rotation of the pedestal 84, it is also contemplated that the mounting frame 22 be rotatably adjustable relative to the pedestal 84 itself for providing for an exact positioning of the digging blades 32. This final adjustment is effected by means of a double-acting hydraulic ram 96 pivotally engaged between the upper end portion of the pedestal 84 and an adjacent one of the inclined upper beams 26 whereby, upon an extension or retraction of the ram 96, a rotational swinging of the frame 22 about the socket mounted peaked end 28 will be effected.

From the foregoing, the operation of the machine 20 should be readily apparent. Basically, the machine is mounted to a power supplying vehicle, such as a tractor or the like, through a conventional three-point hitch. The hitch is elevated so as to raise the machine and the machine transported to the particular plant to be dug. Upon arriving at the digging site, the frame is swung into position over the plant and, with the digging blades 32 swung outward, the frame is lowered into engagement with the ground. The blades 32 are then drawn inwardly into digging position about the plant by means of the hydraulic ram 62 with the ram 62 then being locked so as to retain the digging orientation of the blades 32. The blades 32 are then forcibly driven into the ground with this driving action mainly resulting from an actuation of the pneumatic ram 36 associated with each blade 32, the hydraulic rams 42 assisting in the moving and guiding of the blades 32 into the ground. This combination of hydraulic and pneumatic rams is deemed particularly significant in that, especially in hard ground, hydraulic rams would merely tend to lift the machine off the ground, while the more rapidly operating pneumatic rams actually effect a driving of the blades into the ground. Subsequent to a driving of the blades 32 to the desired depth, the pivotally mounted lower portions 68 of the blades 32 are swung inwardly beneath the plant so as to form a ball of dirt to be removed with the plant. Next, the plant is raised from the ground through a retraction of the rams, this retraction being effected primarily by the hydraulic rams with the pneumatic rams acting as stabilizing and guiding means during the retracting operation. Once the plant and ball of dirt has been removed from the ground, the entire apparatus can be lifted vertically by the tractor three-point hitch and swung so as to deposit the plant on, as one example, a trailer being drawn directly behind the tractor.

Referring now specifically to FIGS. 11–15, a modified form of plant digging machine 98 has been illustrated therein, this machine 98 being particularly adapted for use in removing small trees.

The machine 98 includes a pair of rigid horizontal laterally spaced mounting or support arms 100. Each of the arms 100 terminates, at the inner end thereof, in a longitudinally directed integral rigid link or ear 102 by which the arm is fixed to one of the lower links or bars 104 of a tractor three-point hitch 106. This engagement between the ear 102 and the corresponding link 104 is effected by means of a ball or universal joint.

Figure 14:
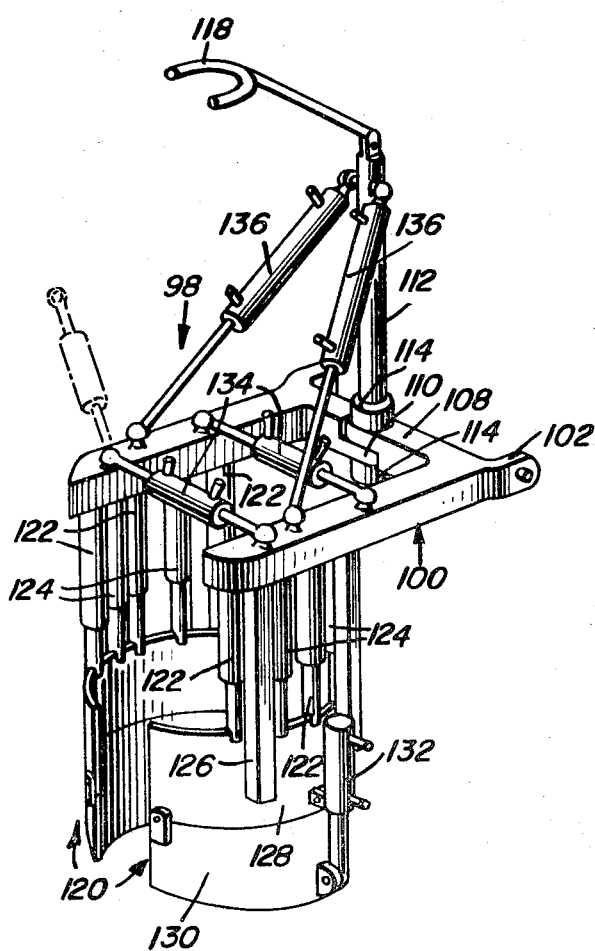
FIG. 14 is an enlarged perspective view of the machine of FIG. 11.

Integral with that end of each arm 100 from which the mounting ear 102 projects is a laterally directed rigid beam-like portion 108 with the two beam-like portions 108 being in alignment with each other and terminating in free offset appertured end portions 110, the end portions 110 overlapping each other, as will be best appreciated from FIG. 14, and being rotatably received on a vertically elongated pedestal or post 112. The overlapped post receiving ends 110 are snugly although rotatably received between upper and lower positioning collars 114 fixed to the pedestal 112 immediately above and below the overlapped ends 110. The upper end of the pedestal 112 is engaged and stabilized by the rearwardly directed tractor stabilizing bar 116 with the pedestal 112 additionally including an outwardly directed tree stabilizing yoke 118 which helps to support a tree during a raising of the tree from the ground.

A vertically oriented arcuate digging blade 120 is associated with each arm 100 and orientated in vertically spaced relation thereto, the blades 120 being laterally opposed from each other for engagement to the opposite sides of a small tree or the like received therebetween. Three pneumatic rams 122 are rigidly affixed to and extend between each mounting arm 100 and the associated digging blade 120 for effecting a positive driving of the blade 120 into the ground about the plant to be removed. In addition, a pair of double-acting hydraulic rams 124 are also provided so as to both assist in guiding the blade as it moves into the ground, and so as to subsequently raise the blade and the plant and dirt ball from the ground. Each of the blades 120 is further guided during the vertical movement thereof by a pair of guides or guide members 126 which are affixed to each mounting arm 100 and project vertically therefrom so as to lie against the outer arcuate face of the underlying vertically movable digging blade 120.

Figure 15:
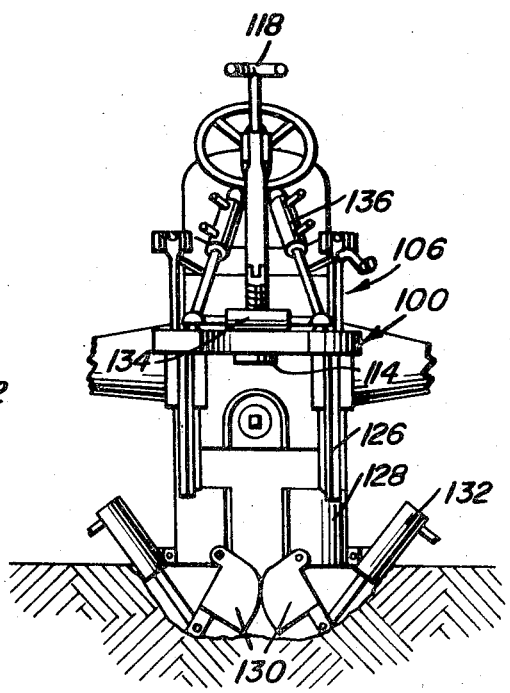
FIG. 15 is a rear elevational view of the machine of FIG. 11 orientated in the position assumed upon a completion of the formation of the ball of soil to be removed with the plant.

Each of the digging blades 120 as was the case with the digging blades 32, is formed of upper and lower digging blade portions 128 and 139 whith each lower portion 130 being hingedly or pivotally mounted to the upper portion 128 at the free side edges thereof so as to pivot downwardly and inwardly beneath a tree or the like as suggested in FIG. 15. The lower blade portions 130 are hydraulically positioned, after a driving of the blades 122 to the desired depth, by appropriate double-acting hydraulic rams 132 which extend between and are pivotally engaged with the upper and lower blade sections 128 and 130 of each blade 120. Incidentally, it will be noted that these rams 132 have been illustrated as, in operation, swinging outwardly relative to the upper blade portion 128, rather than inwardly within a recess as indicated in connection with the blades 32. However, it should be appreciated that either arrangement of the hydraulic rams used to inwardly direct the lower blade portions can be utilized as desired.

The two arms 100 are, as noted previously, mounted on the pedestal 112 for outward and inward swinging movement relative to each other. Such movement is so as to facilitate a positioning of the digging blades 120 about a tree or the like to be dug. The actual movement of the arms 100 is effected by a pair of double-acting hydraulic rams 134, each pivotally engaged at the opposite ends thereof with the two mounting arms 100. Further, the two rams 134 are positioned longitudinally along the arms 100 so as to receive the tree to be dug therebetween. As such, the forward ram is releasably secured to one of the arms 100 at one end thereof in a manner whereby this one end can be quickly detached and the ram 134 swung out of the way, as illustrated in phantom lines in FIG. 14, for the reception of the tree thereby. Once the tree is positioned, the ram is re-engaged with the opposite arm 100 and both rams 134 operated so as to properly position the blades 120 for driving. Once the blades 120 have been driven vertically, and the lower blade portions 132 pivoted inwardly beneath the tree, the tree and the associated ball of dirt is raised vertically from the hole, after which the entire unit can be transported to the point of discharge of the plant. Incidentally, in order to stabilize the mounting arms during the operation of the device, a pair of hydraulic stabilizers 136 are engaged between the upper portion of the pedestal 112 and the forward portions of the mounting arms 100. Further, it should be appreciated that the three-point hitch 106 itself includes, as is conventional in some tractors, ball or universal joints which will accommodate the inward swinging of the arm mounting ears 102 as the arms 100 themselves pivot outward for a positioning of the blades about a plant or tree.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A plant digging machine comprising a plurality of opposed soil-penetrating blades orientated generally upright for driving into the soil about a plant, means for downwardly driving said blades, each of said blades including upper and lower portions, the lower portion of each blade being pivotally engaged with the upper portion and swingable laterally thereof so as to underlie and support soil within said blades, and means for laterally swinging the lower portion of each blade.

2. The machine of claim 1 including means for laterally adjusting said blades toward and away from each other independently of the swinging of the lower portions of the blades.

3. The machine of claim 2 wherein said means for downwardly driving said blades comprise pneumatic rams.

4. The machine of claim 3 including a plurality of hydaulic rams engaged with said blades in addition to said pneumatic rams, said hydraulic rams being operable to effect a vertical extraction of said blades.

5. The machine of claim 4 wherein two blades are provided, said blades being arcuate in configuration and opening laterally toward each other so as to at least partially encircle a plant during the digging operation.

6. The machine of claim 5 including a support frame, said support frame comprising vertical ground-engaging columns and column interconnecting beams rigidly affixed to the upper end portions of said columns, a pair of laterally spaced support rails affixed to opposed pairs of said columns, said pneumatic and hydraulic rams having the upper portions thereof pivotally affixed to said rails for a lateral swinging of the rams and the associated blades toward and away from each other.

7. The machine of claim 6 wherein the means for laterally adjusting said blades toward and away from each other comprises a double-acting power ram engaged between one pivotally mounted ram associated with each blade.

8. The machine of claim 7 including a vertically orientated pedestal laterally of said support frame, means rotatably supporting said pedestal, means for rotatably swinging said pedestal, a generally laterally directed support arm rigid with the supper end of said pedestal, and means rotatably suspending said support frame from said pedestal.

9. The machine of claim 5 including a pair of generally horizontally orientated laterally spaced support arms, said pneumatic and hydraulic rams being affixed to and depending from said support arms for the suspension of said blades therebelow, and means engaged between said arms for enabling a lateral movement of said arms toward and away from each other.

10. The machine of claim 9 wherein the means for laterally adjusting said blades toward and away from each other comprise a pair of power rams extending between and engaged with said arms for effecting a lateral movement of the arms, and consequently the blades, toward and away from each other.

11. The machine of claim 10 wherein the rams engaged between said arms are laterally spaced from each other, one of these arm-engaging rams having a first end thereof releasably secured to one arm and a second end thereof enabling an upward and outward pivoting of this ram so as to provide for an introduction of a tree or the like between the arms and between the arm engaging rams.

12. The machine of claim 11 including a vertically elongated pedestal, said arms being pivotally mounted on said pedestal, and fluid stabilizers engaged between said pedestal and each of said arms.

13. The machine of claim 2 including an upright support frame, said support frame comprising a plurality of vertical columns, beams rigidly engaged with and interconnecting the upper end portions of said columns, said means for downwardly driving said blades being engaged between said frame and said blades so as to react against said frame during the driving operation, and means for vertically and horizontally adjusting the position of said frame and hence the blades associated therewith.

14. The machine of claim 2 including a pair of generally horizontally orientated support arms, said means for downwardly driving said blades being engaged between said support arms and said blades, said support arms overlying said blades.

References Cited
UNITED STATES PATENTS

| | | | |
|---|---|---|---|
| 2,863,258 | 12/1958 | Gish | 214—3 |
| 3,191,982 | 6/1965 | Goalard | 294—88 |

FOREIGN PATENTS

| | | | |
|---|---|---|---|
| 903,555 | 2/1954 | Germany | 214—653 |

ANDRES H. NIELSEN, Primary Examiner

U.S. Cl. X.R.

294—88